United States Patent
Choi et al.

(10) Patent No.: US 8,019,348 B2
(45) Date of Patent: Sep. 13, 2011

(54) COMBINED BASE TRANSCEIVER STATION AND BASE STATION CONTROLLER HANDOFF

(75) Inventors: Myoung Chul Choi, Plano, TX (US); Hyunyung Cha, Plano, TX (US); Hyeon Bong Park, Plano, TX (US); Jae Kyu Yoo, Richardson, TX (US)

(73) Assignee: Airwalk Communications, Inc., Richardson, TX (US)

( * ) Notice: Subject to any disclaimer, the term of this patent is extended or adjusted under 35 U.S.C. 154(b) by 0 days.

(21) Appl. No.: 11/037,814

(22) Filed: Jan. 18, 2005

(65) Prior Publication Data
US 2005/0192012 A1    Sep. 1, 2005

Related U.S. Application Data

(60) Provisional application No. 60/537,408, filed on Jan. 16, 2004, provisional application No. 60/537,419, filed on Jan. 16, 2004.

(51) Int. Cl.
*H04W 36/00* (2009.01)
(52) U.S. Cl. ........ 455/442; 455/422; 455/420; 455/453; 455/450; 455/561
(58) Field of Classification Search .................. 455/442, 455/440, 439, 436, 428, 432.1, 435.1, 435.2, 455/453, 450, 561, 422, 420
See application file for complete search history.

(56) References Cited

U.S. PATENT DOCUMENTS

| | | | |
|---|---|---|---|
| 5,946,621 A * | 8/1999 | Chheda et al. | 455/440 |
| 6,070,073 A | 5/2000 | Maveddat et al. | |
| 6,415,149 B1 * | 7/2002 | Bevan et al. | 455/442 |
| 6,885,668 B1 | 4/2005 | Lee et al. | |
| 7,031,747 B2 | 4/2006 | Cyr et al. | |
| 7,127,248 B1 | 10/2006 | Costa et al. | |
| 7,133,672 B2 | 11/2006 | Sayeedi | |
| 7,299,052 B2 | 11/2007 | Ji et al. | |
| 7,313,398 B1 * | 12/2007 | Ramahi | 455/436 |
| 2002/0077112 A1 * | 6/2002 | McIntosh et al. | 455/453 |
| 2002/0085532 A1 | 7/2002 | Kim | |
| 2003/0119518 A1 | 6/2003 | Cleveland et al. | |
| 2003/0148765 A1 * | 8/2003 | Ma et al. | 455/438 |
| 2003/0223393 A1 | 12/2003 | Lee | |
| 2004/0001474 A1 | 1/2004 | Simelius | |
| 2004/0110512 A1 | 6/2004 | Lim | |
| 2004/0120277 A1 * | 6/2004 | Holur et al. | 370/328 |
| 2004/0203957 A1 | 10/2004 | George | |
| 2005/0101329 A1 | 5/2005 | Gallagher | |
| 2005/0105485 A1 * | 5/2005 | Cleveland | 370/320 |
| 2005/0186948 A1 | 8/2005 | Gallagher et al. | |
| 2007/0014281 A1 | 1/2007 | Kant | |
| 2007/0238448 A1 | 10/2007 | Gallagher et al. | |
| 2007/0243872 A1 | 10/2007 | Gallagher et al. | |
| 2007/0254648 A1 | 11/2007 | Zhang et al. | |

* cited by examiner

Primary Examiner — Kwasi Karikari

(57) ABSTRACT

A system, method, and computer readable medium for a softer handoff comprises receiving a Pilot Strength Measurement Message (PSMM) to request a handoff by a selector distribution unit (SDU), receiving a softer handoff request message by a channel element control (CEC), receiving a softer handoff request message by a radio call control (RCC), receiving a traffic channel assignment message by the CEC, and receiving an indication of an addition of a new sector for the softer handoff by the SDU.

11 Claims, 9 Drawing Sheets

COMBINED BASE TRANSCEIVER STATION AND BASE STATION CONTROLLER HANDOFF

CROSS REFERENCE TO RELATED APPLICATIONS

The present patent application is related to and claims the benefit of provisional patent application No. 60/537,408, filed on Jan. 16, 2004, entitled CDMA Radio Access Network System and Method, and provisional patent application No. 60/537,419, filed on Jan. 16, 2004, entitled CDMA IP Base Transceiver Station, the contents of which are enclosed by reference herein. The present patent application is further related to patent application Ser. No. 11/037,063 entitled Combined Base Transceiver Station and Base Station Controller, patent application Ser. No. 11/037,813 entitled Combined Base Transceiver Station and Base Station Controller Call Origination and Termination, patent application Ser. No. 11/037,386 entitled Combined Base Transceiver Station and Base Station Controller Data Call, patent application Ser. No. 11/037,388 entitled Combined Base Transceiver Station and Base Station Controller Data Call And Quality Of Service, and patent application Ser. No. 11/037,388 entitled Combined Base Transceiver Station and Base Station Controller Optimized Assignment Of Frame Offsets, each of which is assigned to the assignee of the present invention and is filed on even date herewith.

BACKGROUND OF THE INVENTION

The present invention is related to a base transceiver station and a base station controller, and, more specifically to a combined base transceiver station and a base station controller.

Current cellular operators predominantly provide services via very large or macro coverage areas. Limitations encountered by these operators include the difficulty of providing reliable in-building or campus coverage. Such coverage should provide subscribers with seamless services at a particular quality level, and should provide operators with additional revenue sources.

Therefore, what is needed is a wireless solution that overcomes the aforementioned limitations by providing a micro solution that compliments the wireless macro network by providing increased voice and data capacity and coverage.

SUMMARY OF THE INVENTION

The present invention provides a radio access network (RAN) system (which contains a base transceiver station and a base station controller integrated into a single compact platform) for wireless coverage and in-building services, as well as for providing additional capacity in a macro network when it comes to filling "hotspots." Such a RAN system, which preferably operates in or in conjunction with a CDMA network, supports signaling, traffic, handoff, power, and control, while providing multiple interfaces to the core network.

In one embodiment, a method for a softer handoff comprises receiving a Pilot Strength Measurement Message (PSMM) to request a handoff by a selector distribution unit (SDU), receiving a softer handoff request message by a channel element control (CEC), receiving a softer handoff request message by a radio call control (RCC), receiving a traffic channel assignment message by the CEC, and receiving an indication of an addition of a new sector for the softer handoff by the SDU.

In another embodiment, a method for a softer handoff comprises receiving a request for a handoff by a base station controller (BSC), receiving a softer handoff request message by a base transceiver station (BTS), wherein the BSC and the BTS are co-located, receiving a traffic channel assignment message by the BTS, and receiving an indication of an addition of a new sector for the softer handoff by the BSC.

In a further embodiment, a system for a softer handoff comprises a base transceiver station (BTS) adapted to receive a softer handoff request message, the BTS adapted to receive a traffic channel assignment message, and a base station controller (BSC) adapted to receive an indication of an addition of a new sector for the softer handoff, wherein the BTS and the BSC are combined.

In yet another embodiment, a computer readable medium comprises instructions for determining that a softer handoff is to occur by a first module, requesting a resource assignment by a second module, wherein the first module and the second module are coupled, assigning traffic channel elements with an added sector for the softer handoff by the second module, and enabling access to the added sector.

DETAILED DESCRIPTION OF THE INVENTION

Figure 1:
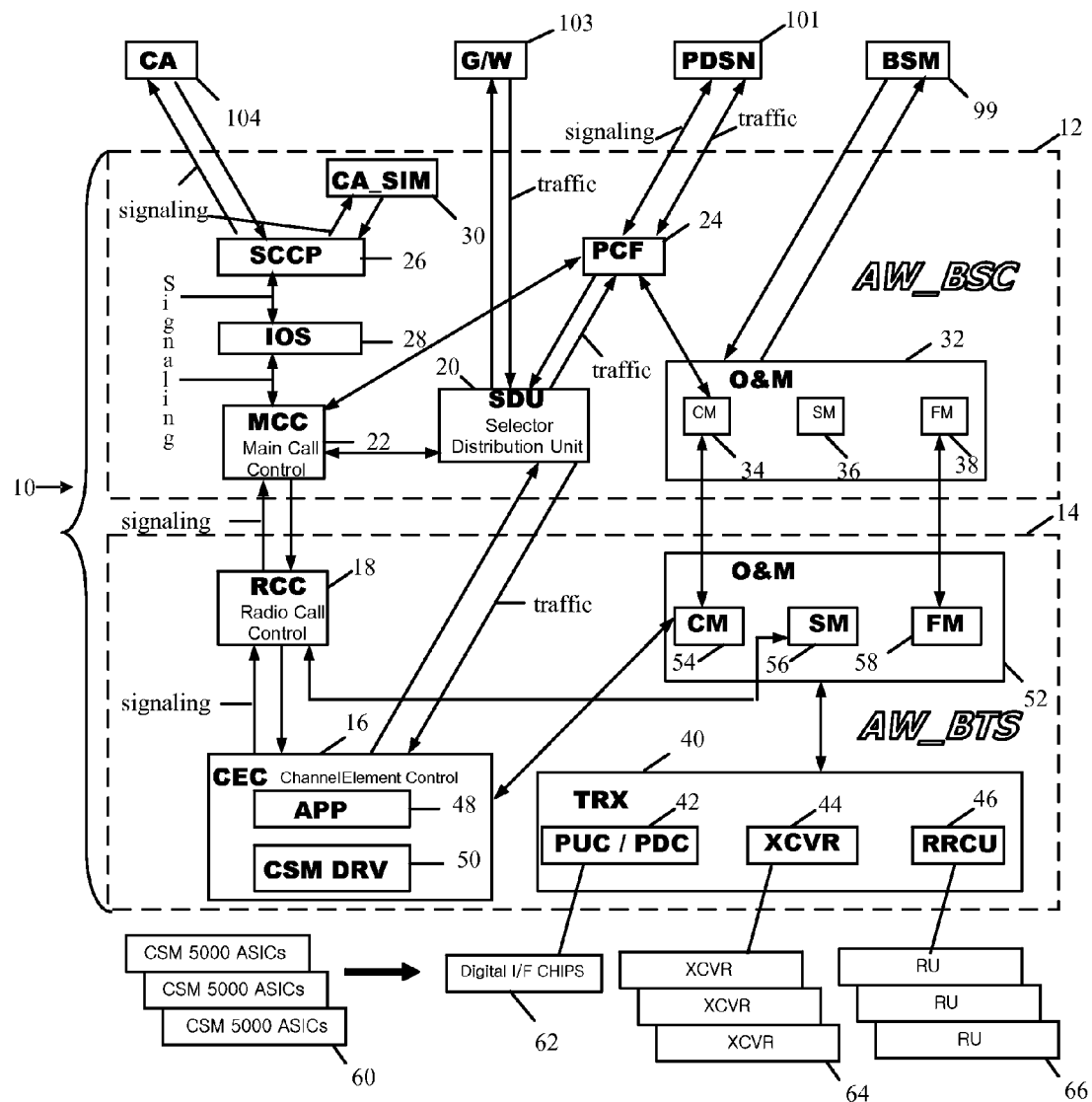
FIG. 1 depicts a radio access network (RAN) in accordance with a preferred embodiment of the present invention.

Referring now to FIG. 1, radio access network (RAN) 10 comprises a base station controller (BSC) 12 and a base transceiver station (BTS) 14 that comprise a number of blocks or modules. These blocks or modules are software, hardware, firmware, and/or a combination of software, hardware, and/or firmware. The BSC 12 comprises a selector distribution unit (SDU) 20 coupled to a main call control (MCC) 22 and to a packet control function (PCF) 24 which is also coupled to the MCC 22, a signaling control connection part (SCCP) 26 coupled to an interoperability system (IOS) 28 which is also coupled to the MCC 22, a call agent simulator (CA_SIM) 30 which is coupled to the SCCP 26, and an operation, administration, and maintenance (OA&M) 32 module coupled to the PCF 24.

Main Call Control (MCC) 22

The MCC 22, which performs the operations that pertain to individual subscribers including registration, call setup, call release, handoff and other subscriber features, is associated with the following functionality:

Registration

Mobile registration is a process where mobile characteristics such as location or status are provided to the network. Registration may be initiated by a mobile station (MS, not shown), by a network, or implied during access by the MS. To support these features, the MCC 22 interfaces with a radio call control module (RCC) 18, which will be described further below, and with a call agent (CA) 104. The CA 104 is preferably a soft switch whose functions include call processing, supplementary service, registration, interacts with a Home Location Register (HLR) in the macro network, and provides common PBX functions.

Mobile Originated Call Setup for Voice and Circuit Data Calls

The MCC 22 receives an Origination Message from the MS via the RCC 18 and then communicates with CA 104 to request call service, confirm the validity of the MS, as well as get the resource information from a media gateway (MG, not shown). The MG mediates the elements between circuit switched voice networks and an IP network. For example, the MG relays voice, fax, modem and data traffic over the IP network. The MCC 22 interfaces with the RCC 18 to request a radio resource and with the SDU 20 to allocate a selector resource.

Mobile Terminated Call Setup for Voice and Calls and Circuit Data Calls

The MCC 22 receives a Paging Request message from the CA 104 and passes it to the RCC 18 to initiate a mobile terminated call setup scenario. The MCC 22 receives a Page Response Message then communicates with the CA 104 to get the resource information from the MG and indicate for the call to be answered at the MS. The MCC 22 interfaces with the RCC 18 to request a radio resource and with the SDU 20 to allocate a selector resource.

Call Clearing of Voice and Circuit Data Calls

Call clearing may be initiated by either the MS, the SDU 20 or the CA 104. The MCC 22 sends clear messages to the SDU 20 or to the CA 104 and releases internal resources.

Mobile Originated Call Setup for Packet Data Calls

The MCC 22 receives an Origination Message from the MS via the RCC 18 with a data rate to send set to 'true' (DRS=1) and a packet data service option, and then communicates with the CA 104 to request packet data service and confirm the validity of the MS. The MCC 22 interfaces with the PCF 24 to setup a connection to a packet data serving node (PDSN) 101, which exchanges packets with the MS over the radio and the other IP networks, with the RCC 18 to requests a radio resource, and with the SDU 20 to allocate a selector resource.

Reactivation of Packet Data Calls

The MCC 22 supports either the MS initiated or network initiated reactivation from a dormant state. With a MS initiated reactivation, a normal packet data call setup procedure in the MCC ensues, while with a network initiated reactivation, the MCC 22 sends a base station (BS, not shown) Service Request to the CA 104 to begin an initiated call setup as a request from the PCF 24. The BS, which is a fixed station that communicates with the MS, may be a cell, a sector within a cell, a mobile switching center (MSC), or other part of the wireless system.

Call Clearing of Packet Data Calls

Call clearing may be initiated by either the MS, the SDU 20, the CA 104 or the PCF 24. During a call clearing scenario, the MCC 22 sends clear messages to the SDU 20, the CA 104 and the PCF 24 and releases internal resources.

Transition to Dormancy for Packet Data Calls

If the MS transits to a Dormant State, the MCC 22 proceeds in a normal packet call release scenario and notifies the CA while setting the release cause to "packet call going dormant." The MCC 22 also supports Dormant Handoff.

Short Data Bursts

The MCC 22 supports a Short Data Burst which consists of a small number of frames that are transmitted to a MS with a dormant packet data service instance.

Inter-BS Handoff

The MCC 22 supports soft handoff, inter-frequency assignment (FA) hard handoff and intra-FA hard handoff. The MCC 22 interfaces with the RCC 18 to get radio resources as request from the SDU 20 and manages neighbor lists.

Inter-CA Hard Handoff

When the MCC 22 receives a handoff request message from the SDU 20 and the handoff type is inter-CA hard handoff, the MCC 22 sends a Handoff Required message to the CA 104 to initiate an inter-CA hard handoff as a serving part. If the MCC 22 receives a Handoff Request message from the CA 104, the MCC 22 initiates an inter-CA hard handoff scenario as a target part.

Terminal Authentication

Terminal authentication is the process by which information is exchanged between the MS and the network to confirm the identity of the MS. The MCC 22 delivers relegated messages to the SDU 20, the RCC 18 and the CA 104.

Short Message Service

Short Message Service (SMS) is a mechanism of delivery of short messages over the mobile network. The MCC 22 supports messages and process for SMS mobile originated calls, SMS mobile terminated calls, and SMS Broadcast calls.

Supplementary Services

The MCC 22 supports various supplementary services including Message Waiting, Call Forwarding, Call Delivery, Call Transfer, Three Way Calling, and Conference Calling in terms of communicating with the RCC 18 using a Feature Notification Message or with the SDU 20 using Flash with an Information Message.

Test Calls

The MCC 22 initiates the test call process as a request from the base station manager (BSM 99) or on receiving an Origination Message with a look back service option from the MS.

Call Trace

The MCC 22 initiates the call trace process as a request from the WPM. The MCC 22 stores the related information to a buffer and starts a trace whenever the MS requests call service.

Selector Distribution Unit (SDU) 20

The SDU 20, which includes an air interface portion that processes air messages between the SDU and a MS, a router interface portion that processes messages between the SDU and other software blocks, and a portion that processes voice and data calls, is associated with the following functionality:

Multiplex and De-Multiplex

This function multiplexes and de-multiplexes user traffic and signaling traffic for the air interface.

Forward and Reverse Traffic Frame Selection and Distribution

This function is responsible for selecting the best quality incoming air interface reverse link frame involved in the soft handoff, and distributes forward air interface frames to all channel elements involved in a call.

Handoff Type Decision and Handoff Direction

This function decides a handoff type that will be processed including soft handoff, softer handoff, hard handoff, etc., and directs handoff processing to other software blocks such as the MCC 22 and a traffic channel element (TCE) in the CEC 16.

Process Radio Link Protocol (RLP) Procedures

A RLP Type 1, 2, and 3 is used with IS-95A/B or cdma2000 traffic channels to support CDMA data services. The RLP, which is a connection-oriented, negative-acknowledgement based data delivery protocol, provides an octet stream transport service over forward and reverse traffic channels. The RLP includes procedures to reduce the error rate exhibited by CDMA traffic channels.

Forward and Reverse Power Control

This function generates or utilizes relevant power control information that is exchanged over the air interface or the channel element.

Process Test Call Procedures

This function supports an MS loop-back call, such as a service option 2 and a service option 9 call.

Process Real Time Protocol (RTP) Procedures

This function is responsible for interfacing with a MG or other BSCs.

Process Signaling Layer 2 Procedures

This function performs the layer 2 functionality of the air interface signaling protocol and is responsible for the reliable delivery of the layer 3 signaling messages between the BSC and the MS.

Process Generic Routing Encapsulation (GRE) Procedures

This function is responsible for interfacing with the PDSN 101.

Media Gateway (G/W) 103

The SDU 20 receives data, formats it and then sends it to the G/W 103. Similarly, data received from the G/W 103 can be formatted by the SDU 20.

Signaling Control Connection Part (SCCP) 26

The SCCP 26 is used to provide a referencing mechanism to identify a particular transaction relating to, for instance, a particular call. The current implementation of the A1 interface using TCP/IP protocol employs an SCCP implementation which provides the minimal functionality required to create the CALL context in which to pass IOS messages and monitor the TCP/IP connection. The SCCP 26 is associated with the following functionality:

TCP/IP Connection Establishment

The SCCP creates a TCP/IP socket as a client to communicate with the CA 104.

Signaling Connection Establishment

A new transaction, such as location updating, or an incoming or outgoing call, is initiated on the radio path. Following an Access Request made by the MS on the access channel, the connection establishment is then initiated by the BS.

If the CA 104 decides to perform an inter-CA hard handoff, the connection establishment is initiated by the CA 104.

Signaling Connection Release

This procedure is normally initiated at the CA 104 but in the case of abnormal SCCP connection release, the BS may initiate a connection clearing.

Interoperability System (IOS) 28

The IOS 28 processes messages from the CA 104 or the MCC 22 and converts between internal message format and standard format. A Base Station Application Part (BSAP) is the application layer signaling protocol that provides messaging to accomplish the functions of the A1 Interface component of the CA-BS Interface. The BSAP is split into two sub-application parts: the BS Management Application Part (BSMAP), and the Direct Transfer Application Part (DTAP). The BSMAP supports all Radio Resource Management and Facility Management procedures between the CA 104 and the BS, or to a cell(s) within the BS. BSMAP messages are not passed to the MS, but are used to perform functions at the CA 104 or the BS. A BSMAP message (Complete Layer 3 Information) is also used together with a DTAP message to establish a connection for a MS between the BS and the CA 104, in response to the first layer 3 air interface message sent by the MS to the BS for each MS system request. The DTAP messages are used to transfer call processing and mobility management messages between the CA 104 and BS. DTAP messages carry information that is primarily used by the MS. The BS maps the DTAP messages going to and coming from the CA from/into the appropriate air interface signaling protocol.

The IOS 28 is associated with the following functionality:

Encoding Messages

The IOS messages proprietary format from the MCC 22 as the A interface specifications for sending to the CA.

Decoding Messages

The IOS 28 converts messages from the CA 104 to internal messages.

Packet Control Function (PCF) 24

The PCF 24 is a packet control function to manage the relay of packets between the BS and the PDSN 101. In a cdma2000 wireless network, access to packet data services is provided by the PDSN 101. The PCF 24 provides call processing functionality within the Radio Access Network (RAN) interfaces with the PDSN 101 and interfaces with the MCC 22 and the SDU 20 to provide internal signaling and packet delivery. The interface between the PCF 24 and the MCC 22 is called the A9 interface and the interface between the PCF 24 and the SDU 20 is the A8 interface. The interface between the PDSN 101 and the PCF 24, which is the interface between the radio and packet network, is known as the R-P interface or the A10/A11 interface.

The PCF 24 is associated with the following functionality: Main Processing which creates tasks and receives messages over IP, Message Processing which generates and extracts message by packing and unpacking, A10/A11 Processing which processes the A10/A11 interface, A8/A9 Processing which processes the A8/A9 interface, Hash Processing which performs the MD5 hashing function, Timer Processing which handles timer set, timer cancel, and timeout processing, Utility for primitives and debugging commands, and Call Control for call processing of originating, terminated and handoff calls.

Call Agent Simulator (CA_SIM) 30

For wireless voice and data communications, various components, such as the CA 104 in the core network and the IP-BS in the Radio-Access Network, are necessary components. The installation of other components in the core network, such as the CA 104, a HLR, etc., constitutes a large expense. To increase the efficiency and flexibility, a CA-simulator 30 can be provided so that voice and data calls are possible without connecting to the CA 104 or to an HLR. As such, an IP-BS can be installed in a small wireless network without a CA or HLR.

Operation, Administration and Maintenance (OAM) 32

The OAM block 32 is associated with the following functionality: a Configuration Management (CM) block 34 that configures each block or module of the BSC 12 based on program load data (PLD) information (which includes parameters, such as a system ID, an IP address, etc., to configure the system) which can be downloaded from a server, a Status Management (SM) block 36 that obtains a status of the BSC 12 and reports the status to the BSM 99, and a Fault Management (FM) block 38 that checks and detects system faults or alarms and reports them to the BSM.

Referring again to FIG. 1, the radio access network (RAN) 10 further comprises a base transceiver station (BTS) 14. The BTS 14 comprises a Channel Element Control (CEC) 16 coupled to the Radio Call Control (RCC) 18, an Operation, Administration and Maintenance (OAM) 52 block coupled to the CEC, to the RCC, and to a Transmit and Receive Interface (TRX) 40.

The Channel Element Control (CEC) 16

The CEC block 16 controls the call processing to interface with the MS. The CEC also interfaces with upper layer blocks to handle over the air messages to set-up, maintain, and terminate voice and data calls. In order to make these calls, both signaling and traffic frames must be transmitted and received to and from the MS. It is also important for these frames to be transmitted and received at the right time with correct information. This is accomplished by using, for example, a modem chip, such as the Qualcomm CSM5000 modem chip 60, I/F chips 62, a transceiver 64 and a power amplifier 66. The components 60-66 are predominantly hardware components that can be co-located within the RAN 10. The CEC block 16 is associated with the following functionality:

Overhead Channel Configurations

The CEC 16 receives overhead channel configuration messages from the RCM and sets the parameters to the driver of the modem chip 60.

Air Message Encapsulation and Transmission

The CEC 16 encapsulates and sends a frame for sync channel message transmission (at, for example, every 80 msec) and sends a frame for paging channel message transmission (at, for example, every 20 msec). To transmit each frame of the sync and paging channel, the CEC 16 revokes semaphores periodically by external interrupt request source.

CSM Built-In Test

The CEC 16 provides a built-in test function for the modem chip 60 which includes checking a register test, an interrupt test, as well as a reverse ARM test. This test can be performed by an operator's request to show if the modem chip 60 is functioning properly or not.

Forward and Reverse Power Control

The CEC 16 supports forward and reverse power control processing.

Process Time of Day (TOD) Message

The CEC 16 receives the TOD message via a GPS (at, for example, every 2 sec) and processes it to get the system time and GPS status.

Process Loopback Call Procedures

This function supports MS-BTS loop-back call, This function can show if air-interface between MS and BTS works well.

Process Traffic Channel Processing

The CEC 16 is responsible for assigning a traffic channel and clearing it by the order of RCC 18. When the traffic channel is setup, the CEC 16 delivers traffic packets between the SDU 20 and the MS.

Maintain Forward and Reverse Link

The CEC 16 checks the forward and reverse path and reports them to a status or statistics block.

Process High Speed Data Service

The CEC 16 is responsible for processing supplemental channel (SCH) packets for high speed data service which supports up to, for example, 128 kbps. The SCH packets are used if additional channels are needed to handle the transfer of the data.

Process Soft and Softer Handoff Procedure

The CEC 16 is responsible for processing Soft and Softer Handoffs.

Provide H/W Characteristics Test Functionalities

The CEC 16 supports various hardware characteristics tests such as an access probe test, a AWGN test, etc. Theses tests determine if the RF or the IF properties of each of the basestations are in order to ensure (via, for example, a good path) that messages can be transferred.

The CSM application 48 is adapted to receive data from the CSM (or modem chip 60) Driver 50.

Radio Call Control (RCC) 18

The call control of the air interface is provided by the RCC 18. The air interface between the MS and the BTS 14 is specified by, for example, the TLA/EIA-95-A/B and the cdma2000 standards, which include the core air interface, minimum performance, and service standards. The functionalities of the RCC 18 consist of call processing, resource management, and supplementary services. The RCC 18 provides call processing functionality in order to setup and release call and resource management of radio resources such as CDMA channels, traffic channel elements, Walsh code channels, frame offsets, etc. The RCC 18 also provides signaling functionality by interfacing with other relevant software blocks.

The RCC 18 provides various processing functions including: Main Processing which creates tasks and receives messages over IP, Resource Management which processes resource allocation and de-allocation, Message Processing which generates and extracts message by packing and unpacking, Initialization Processing which initializes buffers and variables, RCV. from RSCH processing which processes all messages on the reverse common signaling channel, RCV. from RDCH processing which processes some messages on the reverse dedicated signaling channel, RCV. from MCC processing which processes all messages from the MCC, SND. to FSCH processing which processes all messages sent to MS on the forward common signaling channel, SND. to FDCH processing which processes some messages sent to MS and CEC on forward dedicated signaling channel, SND. to MCC processing which processes all messages sent to the MCC, Layer 2 Processing which processes Layer 2 information, Hash Processing which performs the hash function to decide CDMA channel and Paging Channel number, Timer Processing which handles timer set, timer cancel, and timeout processing, and Utility which provides primitives and debugging commands.

Transmit and Receive Interface (TRX) 40

The TRX block 40 controls and diagnoses hardware devices in the BTS 14, and includes:

The PUC/PDC Block 42

The PUC/PDC 42 up-converts and down-converts between a baseband signal and an IF signal.

The Transceiver Control (XCVR) Block 44

The Transceiver Control Block (XCVR) 44 controls transceiver operations which carry IF signals to a carrier frequency band.

AMP Control Block

For high power amplification of the signal, the IP-BS provides the interface to the AMP. The AMP control block controls AMP operations such as ON/OFF.

Hardware Diagnostic Test Module

The diagnostic test module provides the functionalities for hardware characteristics test of pn3383 such as AWGN test, access probe test, etc. For example, the pn3383 test implements test environment conditions.

The power amplifier (PA) 66, via the RRCU 46, amplifies the output signal because the output of the XCVR 44 tends to be small. As such, a broader coverage area is possible.

Operation, Administration and Maintenance (OAM) Block 52

The OAM block 32 is associated with the following functionality: a Configuration Management (CM) block 34 that configures each block or module of the BTS 14 based on program load data (PLD) information (which includes parameters, such as a system ID, an IP address, etc., to configure the system) received from the BSM (or IP-BS) 99, a Status Management (SM) block 36 that obtains a status of the BTS 14 and reports the status to the BSM, and a Fault Management (FM) block 38 that checks and detects system faults or alarms and reports them to the BSM.

Figure 2:
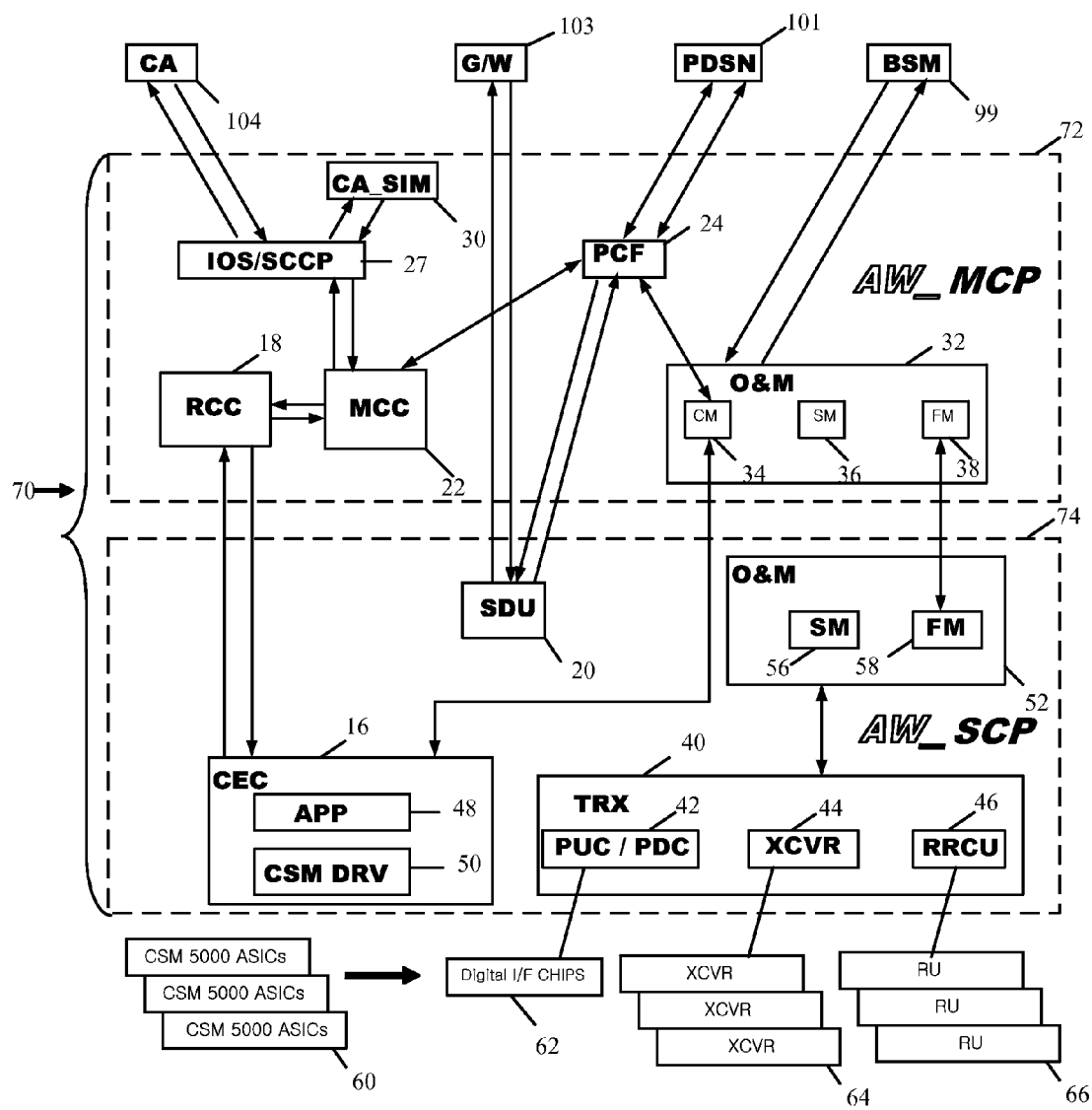
FIG. 2 depicts a stackable RAN in accordance with a preferred embodiment of the present invention.

Referring now to FIG. 2, the components of a stackable IP Radio Access Network (RAN) 70 are depicted. The blocks in the RAN 70 perform a similar functionality to their respective blocks in the RAN 10. Such a stackable RAN 70 provides increased bandwidth and redundancy without utilizing a card based expansion scheme as has been previously employed. Rather, the RAN 70 is modular and stackable (in a very small footprint) and includes a control portion (the Main Control Processor (MCP)) 72 and a device portion (the SDU/CEC Processor (SCP)) 74. With a centralized control portion 72, various device portions 74 can be utilized with a single control portion.

A difference between the RAN 70 and the RAN 10 is that the SDU 20 is now co-located with the CEC 16, and the RCC 18 is co-located with the MCC 22. As such, messaging between these co-located blocks is decreased providing an increase in system performance.

Figure 3:
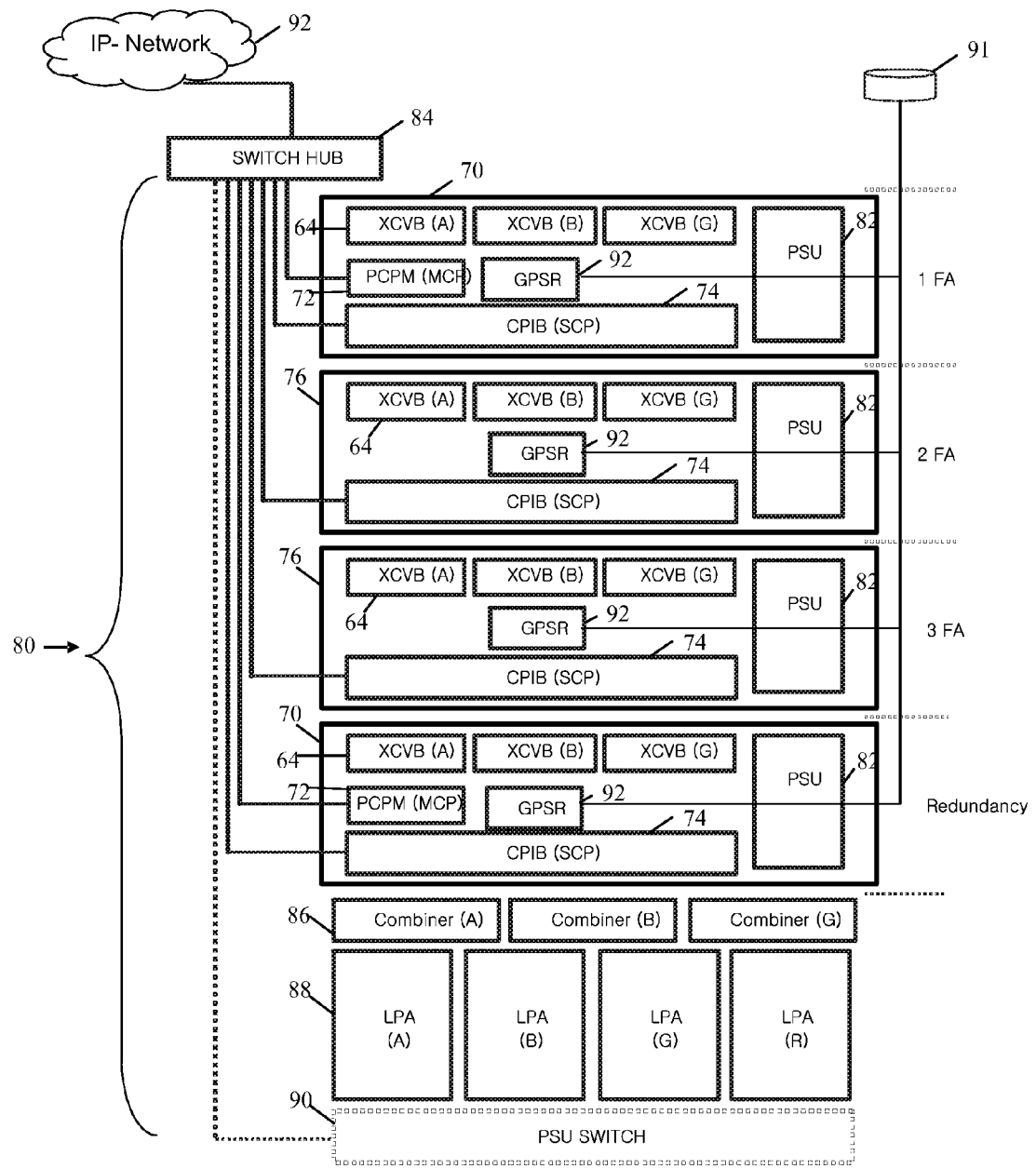
FIG. 3 depicts a further stackable RAN in accordance with a preferred embodiment of the present invention.

Referring now to FIG. 3, a stackable configuration 80 of the RAN of the present invention is depicted. The configuration 80 includes a RAN 70 that includes a master MCP 72 and a RAN 70' that includes a slave MCP 72. The master and slave MCPs preferably have the same IP address for redundancy. If the master MCP fails, a seamless transition to the slave MCP occurs. Backhaul timing is a limited issue because information is transferred between a BTS and a BSC in one "box" and not across a longer distance as with a typical network. The configuration 80 further includes RANs 76 which do not contain an MCP but rather, are controlled by the master MCP 72 in RAN 70. Each of the RANs depicted 70, 70', and 76 include at least one transceiver 64, power supply 82, and GPS receiver 92 that synchronizes the timing between the BSC 12 and the BTS 14 and between the MCP 72 and the SCP 74 per information received from a database 91 and/or GPS related satellites.

The configuration 80 may also include a combiner 86 that may combine a plurality of frequency segments to a common transmission line or antenna, a power amplifier 88 (which is similar to power amplifier 66), and a power supply 90 that could be used to re-set or re-start the RANs 70, 70', and 76. A switch hub 84 may be included to provide a single access (via, for example, an IP address), between the configuration 80 and the IP network 92.

Figure 4:
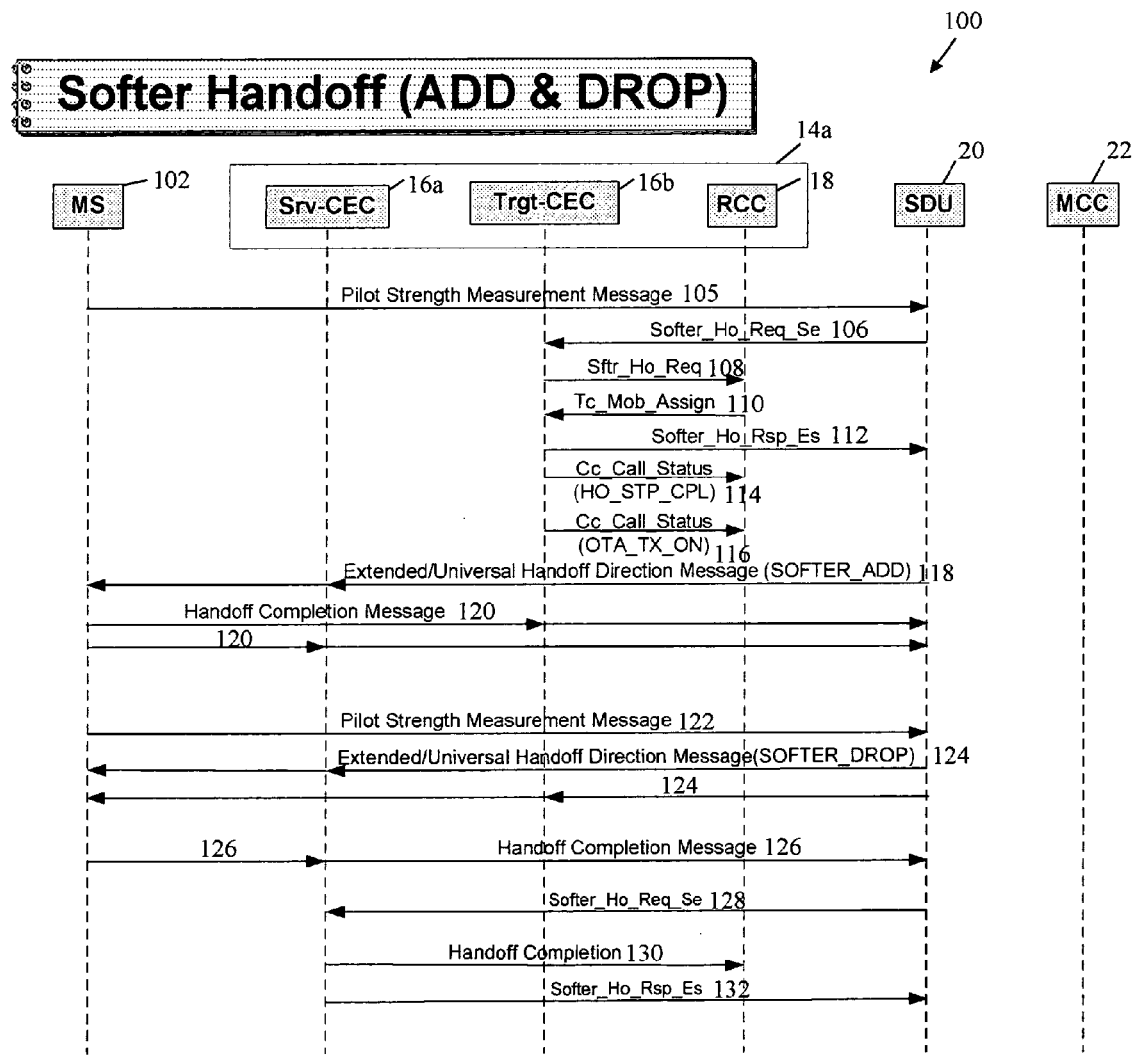
FIG. 4 depicts a softer handoff message flow in accordance with a preferred embodiment of the present invention.

Referring now to FIG. 4, a softer handoff message flow 100 is depicted. The MS 102 transmits a Pilot Strength Measurement Message (PSMM) 105 to request handoff over a traffic channel. The SDU 20 determines that it is Softer Handoff and sends a Softer Handoff Request message 106 to the CEC 16b to request a resource assignment (Softer Add) related to the specified cells. The CEC 16b sends a Sftr_Ho_Req message 108 to the RCC 18 in order to assign TCE with an added sector for softer handoff. The RCC 18 receives the Softer Handoff Request message 108 with added sector information from the CEC 16b to enable the MS 102 to access another sector. Another Walsh Code resource is allocated and a Traffic Channel Assign message 110 with assign type (=SOFTER_HO) and a new allocated Walsh Code Channel information is sent to the CEC 16b.

When the CEC 16b receives the Tc_Mobile_Assign message 110 for softer handoff from the RCC 18, it responds 112 to the SDU 20 that the CEC completed the addition of a new sector for softer handoff. The CEC 16b sends a HO_SETUP_CMPL message 114 that acknowledges the assignment to the RCC 18. The RCC 18 updates the handoff state with waiting OTA_TX_ON, while the CEC sends OTA_TX_ON 116 to the RCC 18. The RCC 18 updates the handoff state with the softer handoff in progress. The SDU 20 sends an Extended/General/Universal Handoff Direction message 118 to the MS 102 to add the new active cell, and the MS 102 indicates the successful result of processing by sending a Handoff Completion message 120 to both serving cell 16a and target 16b.

Again receiving a PSMM 122 from the MS 102, the SDU 20 determines to drop the serving cell and sends the Extended/General/Universal Handoff Direction message 124 to the MS 102 through both the serving cell 16a and the target cell 16b to drop the serving active cell. The MS 102 indicates the successful result of processing by sending a Handoff Completion message 126 to serving cell 16a. The SDU 20 sends a Softer Handoff Request message 128 to the CEC 16a to request a resource release (Softer Drop) related to the serving cells. The CEC 16a sends a Handoff Completion message 130 with a dropped sector to the RCC 18 to release resources for dropping a sector of softer handoff drop.

After receiving a Handoff Complete message 130 from the CEC 16a with a type which indicates if soft or softer handoff, the RCC 18 releases the dropped sector information and the Walsh Code channel, and updates the handoff state with NO_HO. The CEC 16a responds to the SDU 20 that it completed to drop a sector for softer handoff 132.

Figure 5:
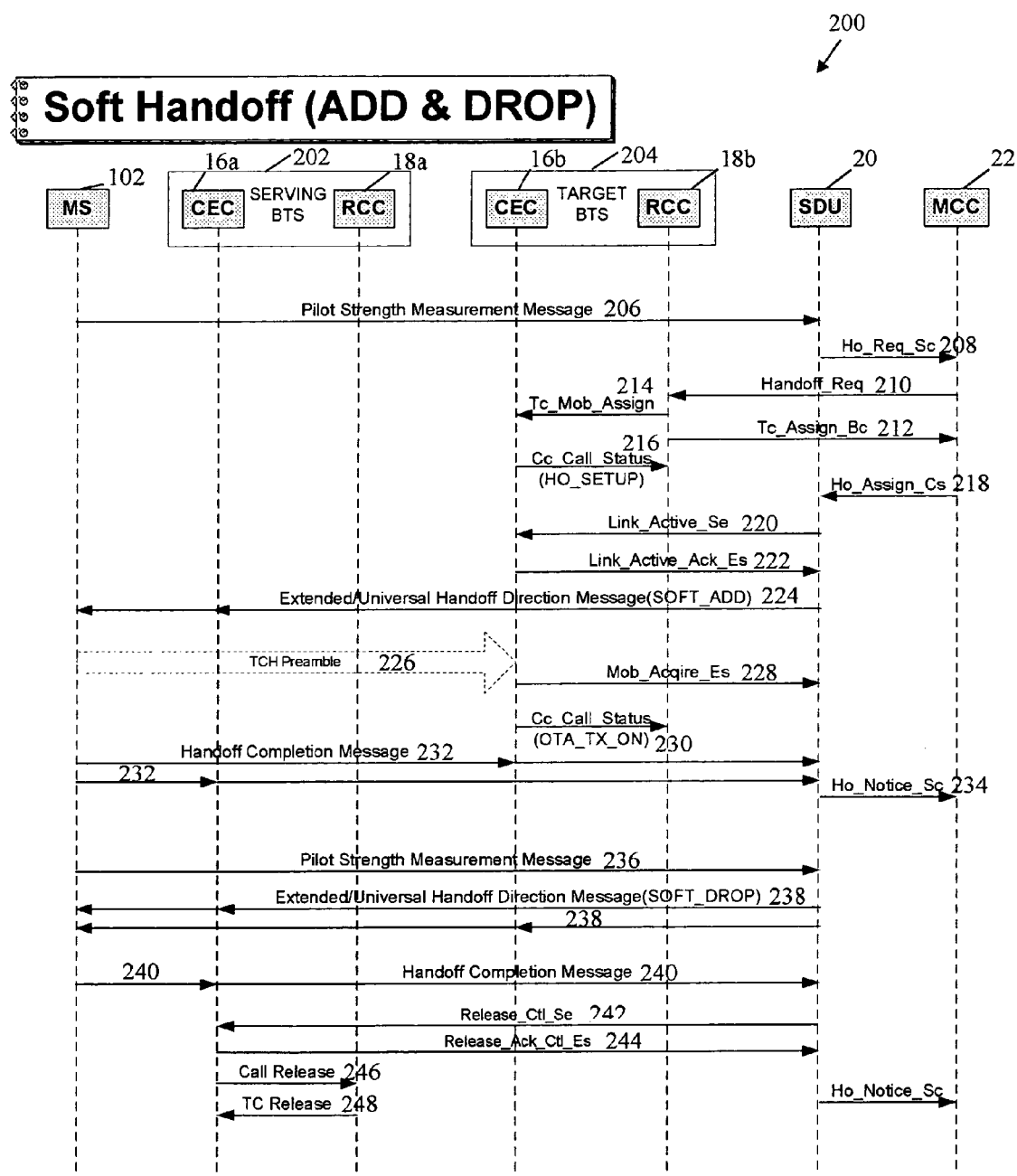
FIG. 5 depicts a soft handoff message flow in accordance with a preferred embodiment of the present invention.

FIG. 5 depicts a soft handoff message flow 200 in which the MS 102 transmits a PSMM 206 to request handoff over a traffic channel. The SDU 20 determines that it is Soft Handoff and sends a Handoff Request message 208 to the MCC 22 to request a resource assignment related to the specified cells that is a different basestation. The MCC 22 sends a Handoff Request message 210 with a preferred handoff type, a FA, and an SDU IP address and port number for the $A_{bis}$ interface to the RCC 18b. The RCC 18b allocates radio resources and a preferred FA (same FA served), and stores the resources and call related information for further processing. The RCC 18b sends a HO TC Assign message 212 with an assigned handoff type (=HO_SOFT_ADD) and resource information to the MCC 22. The RCC 18b sends a Traffic Channel Assign message 214 with an assign type (=SOFT_HO) to the CEC 16b in order to assign Forward and Reverse Traffic Channel Elements.

When the CEC 16b receives Tc_Mobile_Assign 214 from the RCC 18b, it sets CSM driver with the parameters in the message to activate CSM ASICs to prepare handoff call setup. The CEC 16b sends a HO_SETUP_CMPL message 216 to the RCC 18b indicating the CEC sets the traffic channel for soft handoff, and the RCC 18b updates the handoff state with waiting OTA_TX_ON. After receiving the HO TC assign message from the RCC with the result of ASSIN_OK or ASSIGN_ALTERNATIVE, the MCC 22 sends a Handoff Assign message 218 to the SDU 20 with the BTS resource information (such as Traffic Channel Id, communication port number, etc. for handoff from the MCC) and sends a Link_Act_Se 220 message to the target CEC 16b. The CEC 16b assumes that the link between the CEC and the SDU 20 has been established and sends a Link_Act_Ack_Es message 222 to the SDU to acknowledge the receipt of the Link_Active_Se message 220.

The SDU 20 sends an Extended/General/Universal Handoff Direction message 224 to the MS 102 to add the new active cell. When the CEC 16b acquires the preamble 226 of the MS 102, it sends a Mob_Acquire_Es message 226 to the SDU 20. The CEC 16b sends a OTA_TX_ON message 230 to the RCC 18b (which indicates soft handoff call setup is complete) and begins to send forward packets. The RCC 18 then updates the handoff state with NO_HO.

The SDU 20 receives a Handoff Completion message 232 from the MS 102 through the both the serving CEC 16a and target CEC 16b, and indicates successful results of handoff processing by sending a Handoff Notice message 234 to the MCC 22. From this time, the SDU 20 sends and receives traffic packets from/to both the serving CEC 16a and the target CEC 16b. At around this point, the MCC 22 may send a Handoff Perform message to a Call Agent (not shown).

Again receiving a PSMM 236 from the MS 102, the SDU 20 determines the serving cell should be dropped and sends an Extended/General/Universal Handoff Direction message 238 to the MS 102 through both the serving cell 16a and the target cell 16b to drop the serving active cell. The MS 102 indicates the successful result of processing by sending a Handoff Completion message 240 to serving cell 16a.

The SDU 20 sends a Release_Ctl_Se message 242 to the serving CEC 16a to release the serving cell and it responds that the call release was successful by sending a Release_Ack_Ctl_Es message 244 to the SDU 20. The serving CEC 16a stops forward and reserves traffic services and sends a Call Release message 246 to the serving RCC 18a in order to request a release of the traffic channel. The serving RCC 18a releases the original call, de-allocates all resources, and initializes a resource buffer and a call buffer related to this call. The serving RCC 18a sends a TC Release message 248 to the serving CEC 16a to initialize specified Forward and Reverse Traffic Channel Elements. Upon receiving the TC Release message 248 from the serving RCC 18a, the serving CEC 16a shuts down traffic channel operations.

Figure 6:
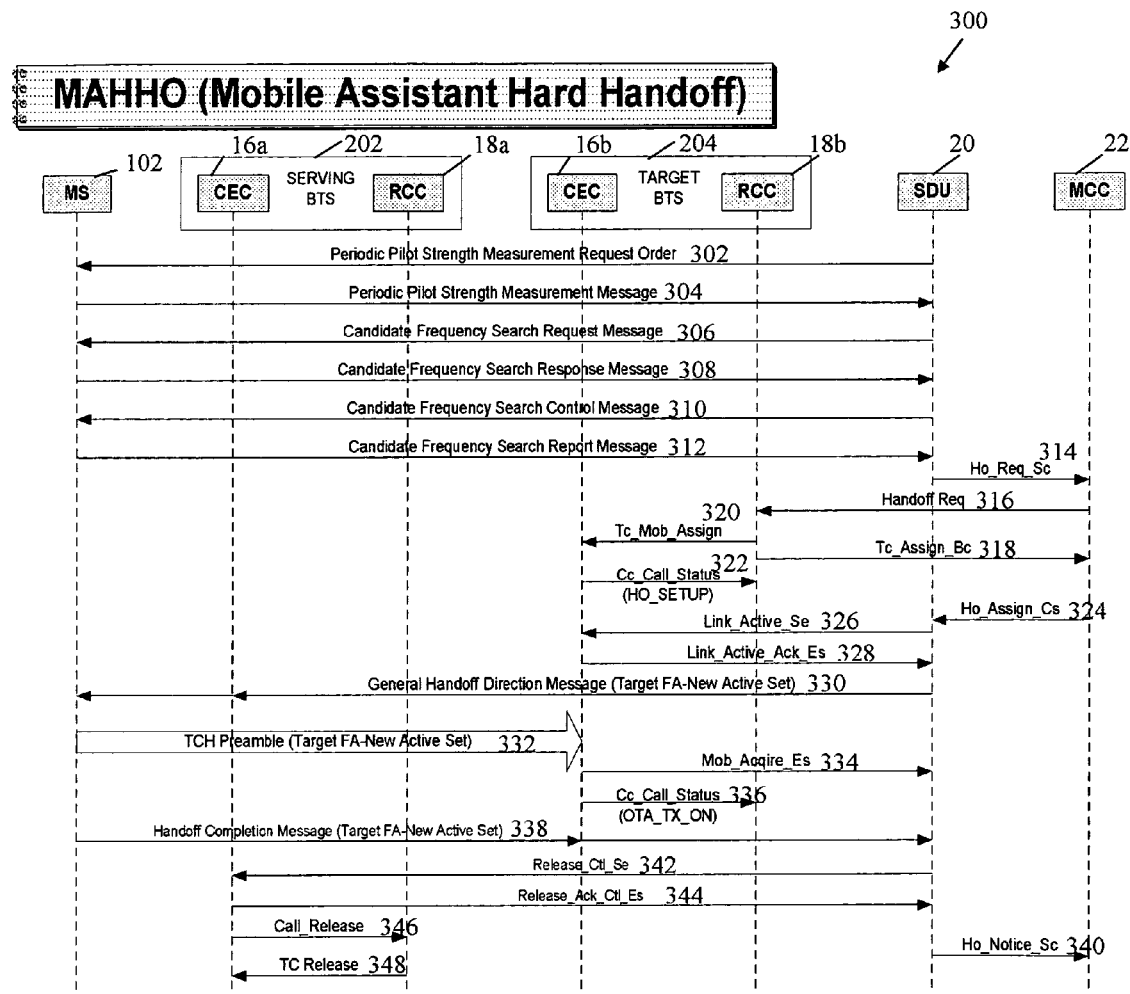
FIG. 6 depicts a mobile assisted hard handoff message flow in accordance with a preferred embodiment of the present invention.

Referring now to FIG. 6, a mobile assisted hard handoff message flow 300 is depicted. The SDU 20 sends a Periodic Pilot Strength Measurement (PPSM) Request Order message 302 to the MS 102 to receive a Periodic PSMM 304 with active cell occupied in the MS 102. Such active cell information includes a pilot PN, a pilot strength, and a number of pilots from the MS 102. The SDU 20 sends a Candidate Frequency Search Request message 306 (with search type=0 PERIODIC_SEARCH, search mode=SEARCH_CDMA, search period=1 time, CDMA frequency) to the MS 102 to get the CDMA frequencies that the MS can search.

The Candidate Frequency Search Response message 308 is sent from the MS 102 to acknowledge the Candidate Frequency Search Request message 306. The SDU 20 sends a Candidate Frequency Search Control message 310 to the MS 102. When a Candidate Frequency Search Report message 312 is received from the MS 102, the SDU 20 searches a reported pilot and checks its strength. If one of the active pilots is greater than a current reference pilot's strength, a decision is made that the handoff type is a Mobile Assistance Hard Handoff. The SDU 20 sends a Handoff Request message 314 to the MCC 22 to assign (type=Mobile Assistance Hard Handoff) allocated resources related to the specified cell that is reported as a different FA.

The MCC 22 sends a Handoff Request message 316 with a preferred handoff type, a FA, and an SDU IP address and port number for the $A_{bis}$ interface. The RCC 18b receives a Handoff Request message 316 with a preferred handoff type (=MAHHO) and a FA from the MCC 22. The RCC 18b allocates radio resources, especially a preferred different FA served, and stores resources and call related information for further processing. The RCC 18b sends a HO TC Assign message 318 with assigned handoff type (=MAHHO) and resource information to the MCC 22. The RCC 18b sends a Traffic Channel Assign message 320 with assign type (=HARD_HO) to the CEC 16b in order to assign Forward and Reverse Traffic Channel Elements. The CEC 16b sets a CSM driver with the parameters in the message to activate the CSM ASICs 60 to prepare for a handoff call setup. The CEC sends a HO_SETUP_CMPL message 322 to the RCC 18b indicating it has set the traffic channel for hard handoff.

The RCC 18b stops the update handoff state with waiting OTA_TX_ON. After receiving the HO TC assign message 318 from the RCC with the result of ASSIN_OK or ASSIGN_ALTERNATIVE, the MCC 22 sends a Handoff Assign message 324 to the SDU 20 with the BTS resource information (such as a Traffic Channel ID, a communication port number, etc. for handoff from the MCC 22), the SDU 20 sends a Link_Act_Se message 326 to the target CEC 16b. The CEC 16b assumes that the link between the CEC 16b and the SDU 20 has been established and sends a Link_Act_Ack_Es message 328 to the SDU 20 to acknowledge the receipt of the Link_Active_Se message 326.

The SDU 20 sends an Extended/General/Universal Handoff Direction message 330 with a target FA and a new active cell to the MS 102 to add the new active cell. When the CEC 16b acquires the preamble 332 of MS 102, it sends a Mob_Acquire_Es message 334 to the SDU 20. The CEC 16b sends a OTA_TX_ON message 336 to the RCC 18b (which indicates the hard handoff call setup is complete) and begins to send forward packet. The RCC 18b updates the handoff state with NO_HO.

The SDU 20 receives a Handoff Completion message 338 from the MS 102 through the target CEC 16b, which indicates a successful result of handoff processing by sending a Handoff Notice message 340 to the MCC 22. From this time, the SDU 20 sends and receives traffic packets from/to the target CEC 16a. The SDU sends a Release_Ctl_Se message 342 to the serving CEC 16a to release serving cell, which responds that call was successfully released by sending a Release_Ack_Ctl_Es message 334 to the SDU 20. The serving CEC 16a stops forward and reverse traffic services and sends a Release message 346 to the serving RCC 18a in order to request a release of traffic channels.

The serving RCC 18a receives a Call Release message 346 from the serving CEC 16a and releases the original call. The serving RCC 18a de-allocates all resources and initializes the resource buffer and the call buffer related to this call. The serving RCC 18a sends a Release message 348 to the serving CEC 16a to initialize specified Forward and Reverse Traffic Channel Elements. Upon receiving the TC Release message 348 from the serving RCC 18a, the serving CEC 16a shuts down traffic channel operations. The MCC may send a Handoff Perform message to a Call Agent.

Figure 7:
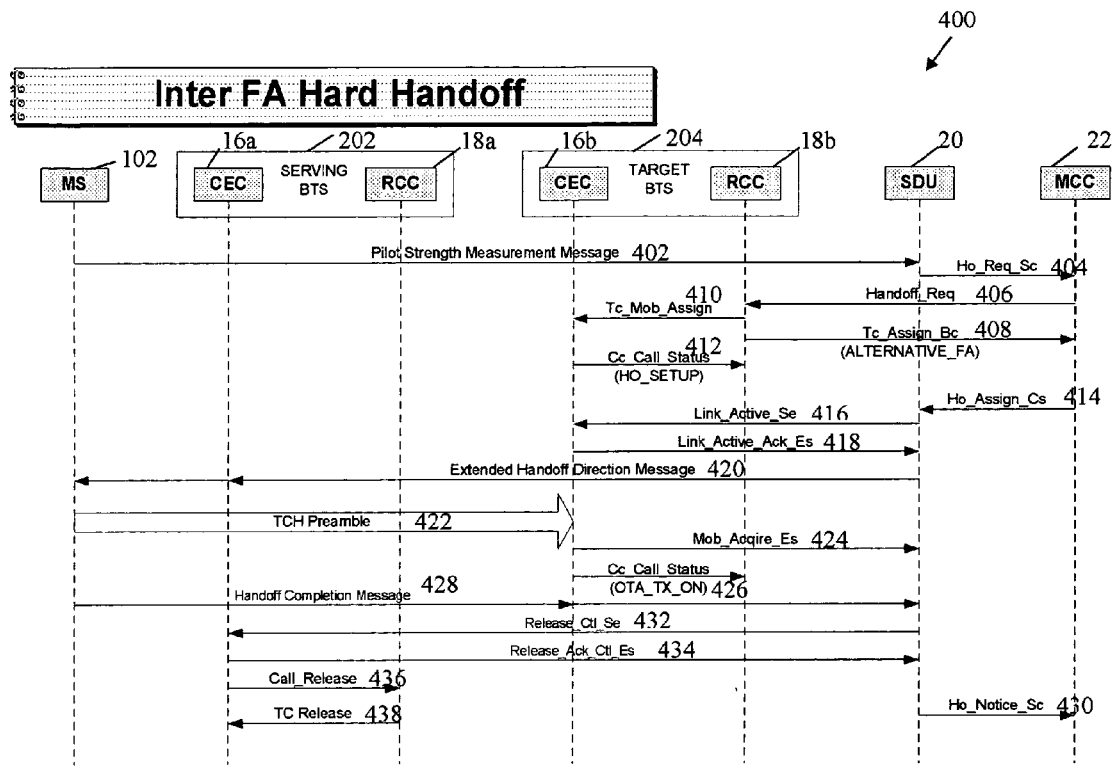
FIG. 7 depicts an inter frequency assignment (FA) hard handoff message flow in accordance with a preferred embodiment of the present invention.

Referring now to FIG. 7, an inter frequency assignment (FA) hard handoff message flow 400 is depicted. The MS 102 transmits a PSMM 402 to request handoff over a traffic channel. The SDU 20 determines that it is an Inter-FA Hard Handoff and sends a Handoff Request message 404 to the MCC 22 to request a resource assignment related to the specified cells that is a different basestation. The MCC 22 sends a Handoff Request message 406 with a preferred handoff type, a FA, and an SDU IP address and port number for the $A_{bis}$ interface to the RCC 18b. The RCC 18b allocates radio resources (a new available FA (different FA requested) because the served FA is not available in this cell), and stores resources and call related information for further processing.

The RCC 18b sends a HO TC Assign message 408 with an assigned handoff type (=HO_INTER_HARD) and resource information with a new FA assigned to the MCC 22. The RCC 18b sends a Traffic Channel Assign message 410 with assign type (=HARD_HO) to the CEC 16b in order to assign Forward and Reverse Traffic Channel Elements. The CEC 16b sets a CSM driver with the parameters in the message to activate the CSM ASICs 60 to prepare a handoff call setup. The CEC 16b sends a HO_SETUP_CMPL message 412 to the RCC 18b indicating it set the traffic channel for hard handoff.

The RCC 18b updates the handoff state with waiting OTA_TX_ON. After receiving a HO TC assign message 408 from the RCC 18b with the result of ASSIN_OK or ASSIGN_ALTERNATIVE, the MCC 22 sends a Handoff Assign message 414 to the SDU 20 with the BTS resource information (such as a new FA, a Traffic Channel ID, communication port number, etc. for handoff from the MCC 22), the SDU 20 sends a Link_Act_Se message 416 to the target CEC 16b. The CEC 16b assumes that the link between the CEC and the SDU 20 has been established and sends a Link_Act_Ack_Es message 418 to the SDU 20 to acknowledge the receipt of the Link_Active_Se message 416.

The SDU 20 sends an Extended/General/Universal Handoff Direction message 420 with a target FA and a new active cell to the MS 102 to add the new active cell. When the CEC 16b acquires the preamble 422 of MS 102, it sends a Mob_Acquire_Es message 424 to the SDU 20. The CEC 16b sends a OTA_TX_ON message 426 to the RCC 18b (indicating the hard handoff call setup is complete) and begins to send forward packet. The RCC 18b updates the handoff state with NO_HO. The SDU 20 receives a Handoff Completion message 428 from the MS 102 through the target CEC 16b, and indicates a successful result of handoff processing by sending a Handoff Notice message 430 to the MCC 22. From this time, the SDU 20 sends 432 and receives 434 traffic packets from/to the target CEC.

The SDU 20 sends a Release_Ctl_Se message 432 to the serving CEC 16a to release the serving cell. When the serving CEC 16a receives the Release_Ctl_Se message 432, it indicates that the call release was successful by sending a Release_Ack_Ctl_Es message 434 to the SDU 20. The serving CEC 16a stops the forward and reverse traffic services and sends a Call Release message 436 to the serving RCC 18a in order to request a release of the traffic channel. The serving RCC 18a receives the Call Release message 436 and releases the original call. The serving RCC 18a de-allocates all resources and initializes a resource buffer and a call buffer related to this call. The serving RCC 18a sends a Release message 438 to the serving CEC 16a to initialize specified Forward and Reverse Traffic Channel Elements. Upon receiving the TC Release message from the serving RCC 18a, the serving CEC 16a shuts down traffic channel operations. The MCC 22 may send a Handoff Perform message to the CA.

Figure 8:
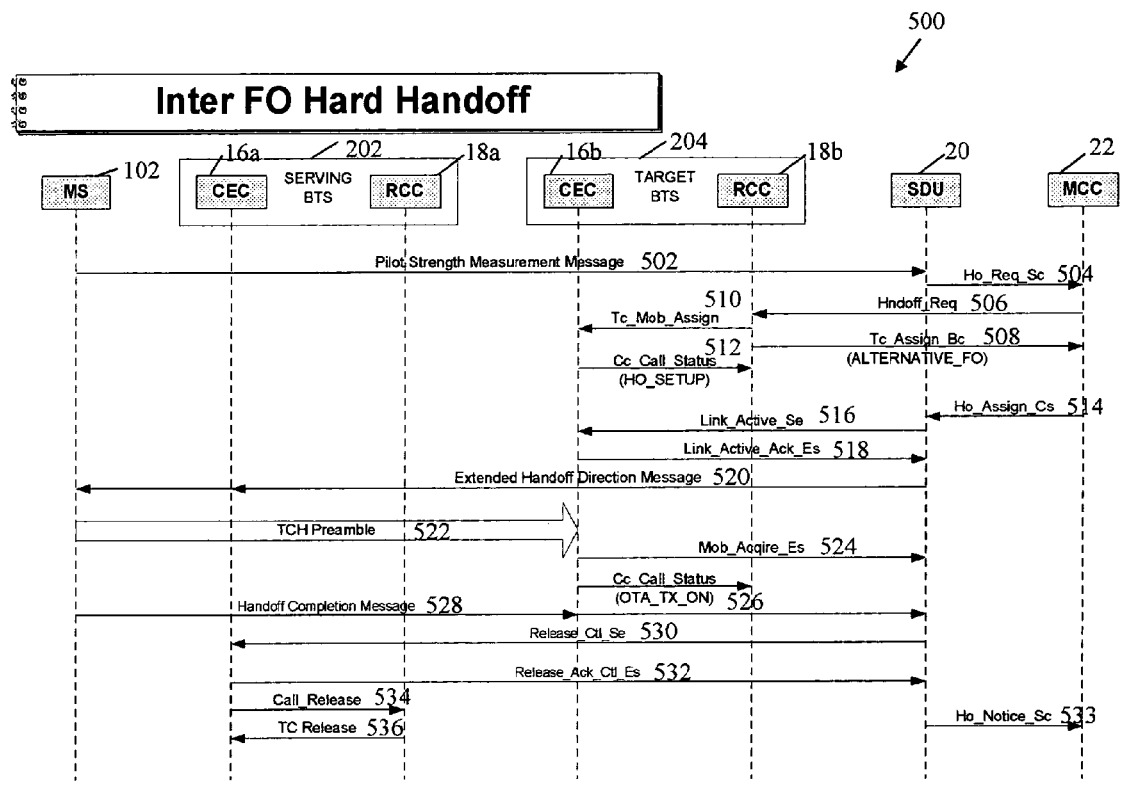
FIG. 8 depicts an inter frame offset (FO) hard handoff message flow in accordance with a preferred embodiment of the present invention.

Referring now to FIG. 8, an inter-frame offset (FO) hard handoff message flow 500 is depicted. The MS 102 transmits a PSMM 502 to request a handoff over a traffic channel. The SDU 20 sends a Handoff Request message 504 to the MCC 22 to request a resource assignment related to the specified cells that is a different basestation. The MCC 22 sends a Handoff Request message 506 with a preferred handoff type, a FA, and an SDU IP address and port number for the $A_{bis}$ interface. The RCC 18b allocates radio resources (especially a new Frame Offset (different FO requested) due to served Frame Offset not being available in this cell), and stores resources and call related information for further processing. The RCC sends a HO TC Assign message 508 with assigned handoff type (=HO_INTER_HARD) and resource information to the MCC 22. The RCC 18b sends a Traffic Channel Assign message 510 with assign type (=HARD_HO) to the CEC 16b in order to assign Forward and Reverse Traffic Channel Elements.

When the CEC 16b receives the Tc_Mobile_Assign message 510 from the RCC 18b, it sets CSM driver with the parameters in the message to activate the CSM ASICs 60 to prepare a handoff call setup. The CEC 16b sends a HO_SETUP_CMPL message 512 to the RCC 16b to set the traffic channel for hard handoff. The RCC 18b updates the handoff state with waiting OTA_TX_ON. After receiving the HO TC assign message 508 from the RCC 18b with the result of ASSIN_OK or ASSIGN_ALTERNATIVE, the MCC sends a Handoff Assign message 514 to the SDU 20 with the BTS resource information. Upon receiving a Handoff Assign message 514 with the information of BTS resource allocation (such as a new FA, a Traffic Channel ID, a communication port number, etc. for handoff from the MCC 22), the SDU 20 sends a Link_Act_Se message 516 to the target CEC 16b.

Upon receiving the Link_Active_Se message 516 from the SDU 20, the CEC 16b assumes that the link between the CEC and the SDU has been established and sends a Link_Act_Ack_Es message 518 to the SDU to acknowledge a receipt of the Link_Active_Se message 516. The SDU 20 sends an Extended/General/Universal Handoff Direction message 520 with a target FA and a new active cell to the MS 102 to add the new active cell. When the CEC 16b acquires the preamble 522 of mobile station 102, it sends a Mob_Acquire_Es message 524 to the SDU 20. The CEC 16b sends a OTA_TX_ON message 526 to the RCC 18b (indicating a hard handoff call setup is complete) and begins to send a forward packet. The RCC updates the handoff state with NO_HO.

The SDU 20 receives a Handoff Completion message 528 from the MS 102 through the target CEC 16b, and indicates a successful result of handoff processing by sending a Handoff Notice message 533 to the MCC 22. From this time, the SDU 20 sends and receives traffic packets from/to the target CEC 16b. The SDU 20 sends a Release_Ctl_Se message 530 to the serving CEC 16a to release the serving cell. When the serving CEC 16a receives the Release_Ctl_Se message 530 from the SDU 20, it indicates the call was released successfully by sending a Release_Ack_Ctl_Es message 532 to the SDU 20. The serving CEC 16a stops forward and reverse traffic services and sends a Call Release message 534 to the serving RCC 18a in order to request a release of the traffic channel. The serving RCC 18a receives the Call Release message 534 and releases the original call. The serving RCC 18a de-allocates all resources and initializes a resource buffer and a call buffer related to this call. The serving RCC 18a sends a Release message 536 to the serving CEC 16a to initialize specified Forward and Reverse Traffic Channel Elements. Upon receiving the TC Release message 536 from the serving RCC 18a, the serving CEC 16a shuts down traffic channel operations. The MCC may send a Handoff Perform message to a Call Agent.

Figure 9:
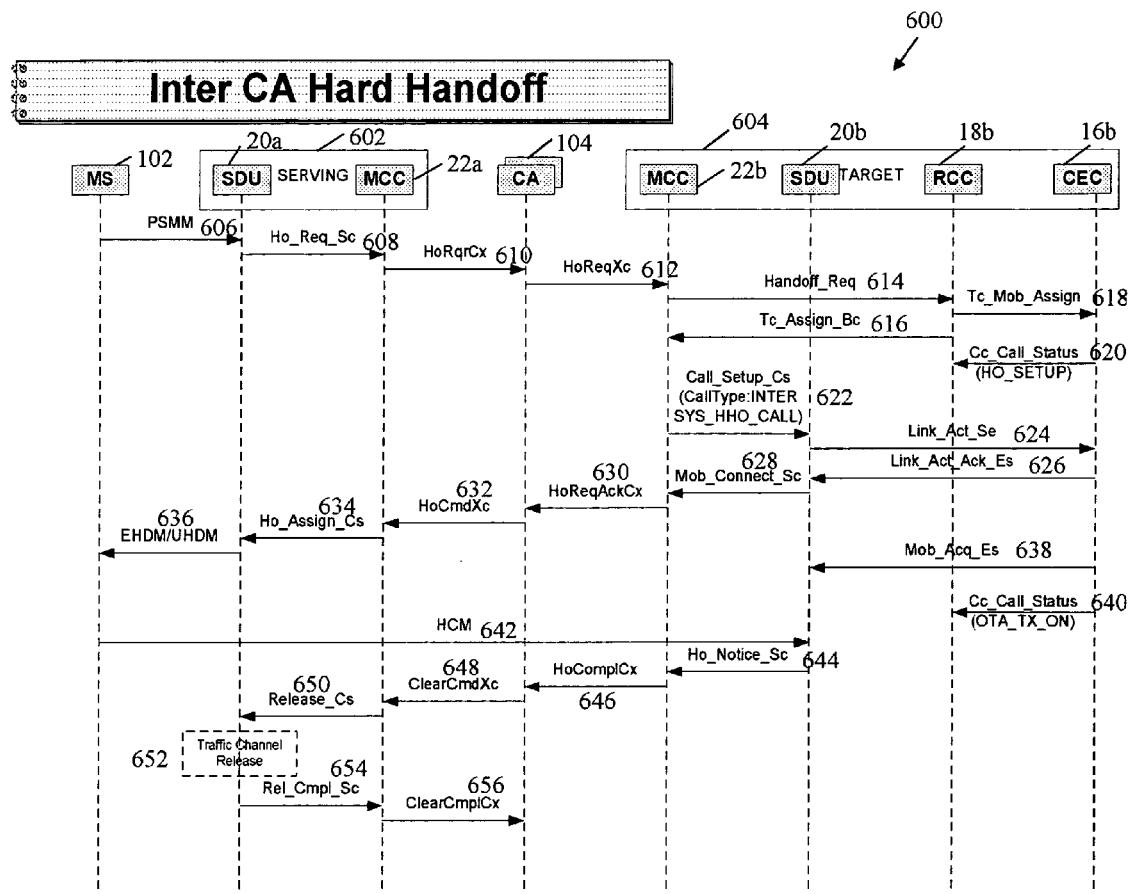
FIG. 9 depicts an inter call agent (CA) hard handoff message flow in accordance with a preferred embodiment of the present invention.

Referring now to FIG. 9, an inter-call agent (CA) hard handoff message is depicted. The MS 102 transmits a PSMM 606 to request a handoff over a traffic channel. The serving SDU 20a sends a Handoff Request message 608 to the MCC 22a to request a resource assignment related to the specified cells that is a different basestation.

The source MCC 22a recommends a hard handoff to one or more cells in the domain of the target BS and sends a Handoff Required message 610 with the list of cells to the CA 104. The target MCC 22b receives a Handoff Request message 612 from the CA 104 with an IS-95 Channel Identity element or an IS-2000 Channel Identity element present since the hard handoff bit was set and/or the Handoff Type element in the Handoff Required message indicated a hard handoff. The target MCC 22b sends a Handoff Request message 614 to the RCC 18b to allocate appropriate radio resources as specified in the message and connects the call.

The RCC 18b receives the Handoff Request message 614 with preferred handoff type (=HO_HARD_SYS_TARGET) and a FA from the MCC 22b. The RCC 18b allocates radio resources (especially a preferred FA), and stores resources and call related information for further processing. The RCC 18b sends a HO TC Assign message 616 with assigned handoff type and resource information to the MCC 22b. The RCC 18b sends a Traffic Channel Assign message with assign type (=HARD_HO) to the CEC 16b in order to assign Forward and Reverse Traffic Channel Elements. When the CEC 16b receives a Tc_Mobile_Assign message 618 from the RCC 18b, it sets a CSM driver with the parameters in the message to activate the CSM ASICs 60 to prepare a handoff call setup. The CEC 16b sends a HO_SETUP_CMPL message 620 to the RCC 18b to set the traffic channel for hard handoff. The RCC updates the handoff state with waiting OTA_TX_ON.

The target SDU 20b receives a Call_Setup_Cs message 622 that is sent from the MCC 22b to request a selector initialization. The SDU 20b sends a Link_Active_Se message 624 with SDU resource information to the CEC 16b. Upon receiving the Link_Active_Se message 624 from the SDU 20b, the CEC 16b assumes that the link between CEC and SDU has been established and sends a Link_Act_Ack_Es message 626 to the SDU 20b to acknowledge a receipt of the Link_Active_Se message. The target SDU 20b sends a Mobile Connect message 628 to the target MCC 22b which sends a Handoff Request Acknowledge message 630 to the CA 104.

The serving MCC 22a receives a Handoff Command message 632 from the CA 104 then sends a HO_Assign_Cs message 634 with the destination BTS resource information to the SDU 20a. The serving SDU 20a sends an Extended/General/Universal Handoff Direction Message 636 with a target FA and new active cell to the MS 102 to add the new active cell. When the CEC 16b acquires the preamble of MS 102, it sends a Mob_Acquire_Es message to the SDU 20b. The CEC 16b sends a OTA_TX_ON message 640 to the RCC 18b (indicating a hard handoff call setup is complete) and begins to send forward packets. The RCC updates the handoff state with NO_HO.

The target SDU 20b receives a Mobile Acquired message 638 from the CEC 16b and a Handoff Completion message 642 from the MS 102 through the CEC, and indicates a successful result of handoff processing by sending a Handoff Notice message 644 to the target MCC 22b. The target MCC 22b sends a Handoff Complete message 646 to the CA 104 to notify it that the MS 102 has successfully completed the hard handoff. The serving MCC 22b receives a Clear Command message 648 from the CA 104 and sends a Release_Cs message 650 to the SDU 20a. When the serving SDU 20a receives a Release_Cs message 650 from the serving MCC 22a, it performs BTS release processing 652 and sends a Release_Cmpl_Sc message 654 to the serving MCC 22a to indicate a successful release. The serving MCC 22a sends a Clear Complete message 656 to the CA 104 to notify it that clearing has been accomplished.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the modules RANs 70, 70', and 76, and/or by one or more of the blocks 16-58. Also, these capabilities may be performed in the current manner or in a distributed manner and on, or via, any device able to transfer information between the RANs, the blocks, and/or other components. Further, although depicted in a particular manner, various blocks may be repositioned without departing from the scope of the current invention. For example, the RCC 18 may be positioned in the BSC 12, while the SDU 20 may be positioned in the BTS 14. Still further, although depicted in a particular manner, a greater or lesser number of RANs and/or blocks may be utilized without departing from the scope of the current invention. For example, additional RANs 76 may be utilized in the configuration 80 of the present invention.

Further, the order of the messages may vary slightly and a lesser or greater number of messages may be utilized with the present invention (and such messages may include complementary or differing information) in order to accomplish the present invention, to provide additional features to the present invention, and/or to make the present invention more efficient. For example, in the mobile assisted hard handoff message flow 300, upon receiving the TC Release message 348 from the serving RCC 18a, the serving CEC 16a shuts down traffic channel operations and the MCC 22 may send a Handoff Perform message to a Call Agent (not shown). Also, various timers may be employed by the present invention. For example, in the case of the soft handoff message flow 200, the CEC 16b sends a HO_SETUP_CMPL message 216 to the RCC 18b indicating the CEC sets the traffic channel for soft handoff. The RCC 18b may stop timer $T_{HO\_SETUP\_CMPL}$ and update the handoff state with waiting OTA_TX_ON. The RCC 18b may then start timer $T_{HO\_OTA\_TX\_ON}$. After receiving the HO TC assign message from the RCC with the result of ASSIN_OK or ASSIGN_ALTERNATIVE, the MCC may stop the timer $T_{HOASSIGNREQ}$, and send a Handoff Assign message 218 to the SDU 20 with the BTS resource information.

What is claimed is:

1. A method for a soft handoff utilizing a Radio Access Network (RAN), comprising:

receiving a Pilot Strength Measurement Message (PSMM) to request a handoff by a selector distribution unit (SDU);

relaying via a Packet Control Function (PCF) call processing functionality between the SDU and a main call control (MCC) to provide internal signaling and packet delivery;

receiving a soft handoff request message by the main call control (MCC);

receiving the soft handoff request message by a radio call control (RCC) from the MCC, wherein the MCC interfaces with the RCC to request a radio resource and the SDU to allocate a selector resource, wherein the SDU determines the soft handoff and initiates a message to the MCC;

receiving the traffic channel assignment message by a channel element control (CEC); and receiving an indication of soft handoff by the CEC from the SDU, wherein the SDU and the CEC are co-located in a first module, and the RCC and the MCC are co-located in a second module, wherein the first module and the second module are integrated into a single compact platform that is modular and stackable for providing wireless coverage.

2. The method of claim 1 comprising updating a handoff state by the RCC.

3. The method of claim 2 comprising receiving a handoff completion message by the CEC.

4. The method of claim 3 comprising receiving a PSMM by the SDU.

5. The method of claim 4 comprising sending a message by the SDU to drop a serving cell.

6. The method of claim 5 comprising receiving a handoff completion message by the CEC.

7. The method of claim 6 comprising receiving a soft handoff request message by the CEC.

8. The method of claim 7 comprising receiving a handoff completion message by the SDU.

9. The method of claim 8, wherein the handoff completion message is received by the CEC from a mobile station after the mobile station receives an Extended/General/Universal Handoff Direction message from the SDU.

10. A method for a soft handoff utilizing a Radio Access Network (RAN), comprising:
   receiving a request for a handoff by a Main Control Processor (MCP);
   receiving a soft handoff request message by a Selector distribution unit (SDU) Channel element control (CEC) Processor (SCP), wherein the SCP includes an SDU and a CEC and the MCP includes a radio call control (RCC) and a main call control (MCC), wherein the SCP and the MCP are integrated into a single compact platform that is modular and stackable for providing wireless coverage, wherein the MCC interfaces with the RCC to request a radio resource and the SDU to allocate a selector resource, wherein the SDU determines the soft handoff and initiates a message to the MCC;
   relaying via a Packet Control Function (PCF) call processing functionality between the SDU and the MCC to provide internal signaling and packet delivery;
   receiving a traffic channel assignment message by the SCP; and
   receiving an indication of an addition of a new sector for the soft handoff by the MCP.

11. A system for a soft handoff utilizing a Radio Access Network (RAN), comprising:
   a main call control (MCC) adapted to receive a soft handoff request message;
   a channel element control (CEC) adapted to receive a traffic channel assignment message;
   a Packet Control Function (PCF) adapted to relay call processing functionality between the SDU and a main call control (MCC) to provide internal signaling and packet delivery;
   the CEC adapted to receive an indication of an addition of a new sector for the softer handoff;
   wherein the CEC and the selector distribution unit (SDU) are co-located in a first module, and the MCC and a radio call control (RCC) are co-located in a second module, wherein the first module and the second module are integrated into a single compact platform that is modular and stackable, wherein the MCC interfaces with the RCC to request a radio resource and the SDU to allocate a selector resource, wherein the SDU determines the soft handoff and initiates a message to the MCC.

* * * * *